United States Patent
Furukawa et al.

(10) Patent No.: US 9,614,418 B2
(45) Date of Patent: Apr. 4, 2017

(54) ELECTRIC CYLINDER AND ELECTRIC CYLINDER SYSTEM

(75) Inventors: Kyoji Furukawa, Shinshiro (JP); Shigeyuki Takagi, Shinshiro (JP)

(73) Assignee: SINTOKOGIO, LTD., Nagoya-shi, Aichi (JP)

( * ) Notice: Subject to any disclaimer, the term of this patent is extended or adjusted under 35 U.S.C. 154(b) by 710 days.

(21) Appl. No.: 14/110,870

(22) PCT Filed: Feb. 28, 2012

(86) PCT No.: PCT/JP2012/055497
§ 371 (c)(1),
(2), (4) Date: Oct. 9, 2013

(87) PCT Pub. No.: WO2013/038729
PCT Pub. Date: Mar. 21, 2013

(65) Prior Publication Data
US 2014/0035443 A1 Feb. 6, 2014

(30) Foreign Application Priority Data
Sep. 14, 2011 (JP) .................. 2011-200169

(51) Int. Cl.
*H02K 7/06* (2006.01)
*H02K 11/00* (2016.01)
(Continued)

(52) U.S. Cl.
CPC ............ *H02K 11/001* (2013.01); *B30B 1/186* (2013.01); *F16H 25/2021* (2013.01); *H02K 7/06* (2013.01);
(Continued)

(58) Field of Classification Search
CPC ........ H02K 7/06; H02K 11/001; H02K 11/20; F16H 25/2021; F16H 25/2096; F16H 2025/2081; B20B 1/186
(Continued)

(56) References Cited

U.S. PATENT DOCUMENTS 7,584,678 B2 * 9/2009 Murao ...................... B30B 1/18
100/289
8,127,620 B2 * 3/2012 Morita ................ F16H 25/2021
73/761
(Continued)

FOREIGN PATENT DOCUMENTS

CN 1182504 A 5/1998
CN 1189254 A 7/1998
(Continued)

*Primary Examiner* — John K Kim
(74) *Attorney, Agent, or Firm* — Drinker Biddle Reath LLP

(57) ABSTRACT

An electric cylinder includes: an outer cylinder including, on one end side, a fixing section; a rod configured to be capable of expanding and contracting in an axis direction from an opening on the one end side of the outer cylinder; a bearing provided on the other end side end and on the inside of the outer cylinder; a rotating shaft supported by the bearing and driven to rotate; a screw mechanism configured to convert a rotational motion of the rotating shaft into a linear motion of the rod and transmit the linear motion; and a distortion detecting unit provided on the outer circumference of the outer cylinder. The outer cylinder includes at least two or more division members that can be divided and combined. The distortion detecting unit is provided in one division member among the two or more division members.

20 Claims, 15 Drawing Sheets

(51) Int. Cl.
*B30B 1/18* (2006.01)
*F16H 25/20* (2006.01)
*H02K 11/20* (2016.01)

(52) U.S. Cl.
CPC ...... *H02K 11/20* (2016.01); *F16H 2025/2081* (2013.01); *F16H 2025/2096* (2013.01)

(58) Field of Classification Search
USPC ................ 310/12, 15, 68 B, 68 R; 74/89
IPC .................................. H02K 7/06,11/00, 11/01
See application file for complete search history.

(56) References Cited

U.S. PATENT DOCUMENTS

| | | | |
|---|---|---|---|
| 9,415,557 B2* | 8/2016 | Furukawa | .................. B30B 1/18 |
| 2007/0169578 A1* | 7/2007 | Christensen | ........ F16H 25/2021 |
| | | | 74/89.37 |
| 2007/0251342 A1* | 11/2007 | Murao | ...................... B30B 1/18 |
| | | | 74/59 |
| 2010/0313682 A1 | 12/2010 | Morita et al. | |
| 2011/0254385 A1* | 10/2011 | Makino | .................. H02K 16/00 |
| | | | 310/12.14 |
| 2013/0291609 A1* | 11/2013 | Furukawa | .................. B30B 1/18 |
| | | | 72/21.4 |
| 2014/0035443 A1* | 2/2014 | Furukawa | ............... B30B 1/186 |
| | | | 310/68 B |

FOREIGN PATENT DOCUMENTS

| | | |
|---|---|---|
| CN | 1074820 C | 11/2001 |
| CN | 1120306 C | 9/2003 |
| CN | 101189451 | 5/2008 |
| DE | 9014783 | 2/1992 |
| DE | 102005040186 A1 | 3/2007 |
| EP | 0482360 A2 | 4/1992 |
| EP | 1801457 A1 | 6/2007 |
| EP | 2184512 A1 | 5/2010 |
| JP | H06-55300 A | 3/1994 |
| JP | 8-117970 A | 5/1996 |
| JP | H09-215264 A | 8/1997 |
| JP | H09-271154 A | 10/1997 |
| JP | H09-289755 A | 11/1997 |
| JP | H10-15765 A | 1/1998 |
| JP | 2007-162850 | 6/2007 |
| TW | 406673 | 7/2011 |
| WO | WO-2006/106817 A1 | 10/2006 |

* cited by examiner

ELECTRIC CYLINDER AND ELECTRIC CYLINDER SYSTEM

TECHNICAL FIELD

The present invention relates to an electric cylinder that is used in, for example, a press-fitting apparatus and a press apparatus and converts a rotational motion of a motor into a linear motion and an electric cylinder system using the electric cylinder.

BACKGROUND ART

In the past, as an electric cylinder used in various apparatuses, for example, there is an electric cylinder described in Japanese Patent Application Laid-Open Publication No. 08-117970 and CN107820C. This electric cylinder includes a piston attached to a ball nut screwed with a screw stock, a motor that controls rotation of the screw stock, a hollow rod provided on the front surface of the piston, and a supporting member inserted into a hollow section of the hollow rod and rotationally provided at the distal end of the screw stock. Urethane rubber is attached to a rod head at the distal end of the hollow rod via an attachment plate. A metal protection plate is provided at the distal end of this urethane rubber. This electric cylinder is robust against high temperature and can reduce a shock. Therefore, the electric cylinder is suitable for use in a push-out apparatus that pushes out a heavy object in a high-temperature state and a receiving apparatus that receives the object.

As the electric cylinder, for example, there is an electric cylinder described in Japanese Patent Application Laid-Open Publication No. 09-271154 and CN1182504A. This electric cylinder includes a motor, plural parallel ball screws coupled to the motor via an electric member, plural ball nuts screwed with the ball screws, a slider that integrally fixes the ball nuts, and a rod fixed to the slider. Further, as the electric cylinder, there is an electric cylinder described in Japanese Patent Application Laid-Open Publication No. 09-289755 and CN1189254A. Furthermore, there is an electric cylinder described in Japanese Patent Application Laid-Open No. 09-215264 and CN1120306C.

CITATION LIST

Patent Literature

Patent Literature 1: Japanese Patent Application Laid-Open Publication No. 08-117970
Patent Literature 2: Chinese Patent Publication No. 1074820C
Patent Literature 3: Japanese Patent Application Laid-Open Publication No. 09-271154
Patent Literature 4: Chinese Patent Laid-Open Publication No. 1182504A
Patent Literature 5: Japanese Patent Application Laid-Open Publication No. 09-289755
Patent Literature 6: Chinese Patent Laid-Open Publication No. 1189254A
Patent Literature 7: Japanese Patent Application Laid-Open Publication No. 09-215264
Patent Literature 8: Chinese Patent Publication No. 1120306C

SUMMARY OF INVENTION

Technical Problem

When the electric cylinder explained above is used in, for example, a press-fitting apparatus or a press apparatus, in some case, it is desired to perform detection of a load of push-out by a rod. When the load detection is performed, for example, it is conceivable to provide a load converter such as a load cell at the distal end of the rod of the electric cylinder. A load value detected by this load cell is used, whereby operations for, for example, performing propriety determination for a press-fitting force in press-fitting and performing press while monitoring the load value up to a target load are enabled.

However, for example, when a load cell 410 is provided at the distal end of a rod 403 of an electric cylinder 401 (provided before a jig 412) as shown in FIG. 15(*a*), there are problems explained bellow. As shown in FIG. 15(*a*), an output cable 411 is connected to the load cell 410. It is likely that a problem such as rupture of this cable 410 (a P1 portion, etc.) is caused by a bending action of the cable 411 due to a repeated reciprocating motion of the rod 403 with respect to an outer cylinder 402. Depending on a target of machining by an apparatus in which this electric cylinder 401 is used, the load cell itself or the output cable interferes (a P2 portion, etc.). It is likely that a problem occurs in that, in order to prevent the interference, for example, it is necessary to use a jig 413 longer than necessary as shown in FIG. 15(*b*) instead of the jig 412 shown in FIG. 15(*a*). When the long jig cannot handle it because there is a limit in an axis direction, there is a problem in that a situation in which the electric cylinder itself cannot be used could occur. In this way, when load detection is necessary, it is difficult to simplify the configuration and reduce the length in the axis direction of the electric cylinder to realize a reduction in size. A system configuration of a system including this electric cylinder is also limited. Further, considering a situation in which the electric cylinder is used as a component of various facilities and apparatuses, it is desired that the electric cylinder is delivered in a short delivery period in addition to realization of the simplification of the configuration and the reduction in the size of the electric cylinder.

In other words, in this technical field, there is a demand for an electric cylinder that can be simplified in a configuration while enabling load detection, can be reduced in the length in an axis direction and reduced in size, realizes a reduction in a delivery period, and realizes flexibility of a system configuration including the electric cylinder.

Solution to Problem

An electric cylinder according to an aspect of the present invention includes: an outer cylinder including, on one end side, a fixing section for fixing to an attachment place of the electric cylinder; a rod configured to be capable of expanding and contracting in an axis direction from an opening on the one end side of the outer cylinder; a bearing provided on another end side end and on the inside of the outer cylinder; a rotating shaft rotatably supported by the bearing and driven to rotate by a driving force of a motor; a screw mechanism configured to convert a rotational motion of the rotating shaft into a linear motion of the rod and transmit the linear motion; and a distortion detecting unit provided in a position between a position on an outer circumference of the outer cylinder where the bearing is provided and the fixing section. The outer cylinder includes at least two or more division members that can be divided and combined. The distortion detecting unit is provided in one division member among the two or more division members.

Advantageous Effects of Invention

In the electric cylinder according to the aspect of the present invention, load detection can be performed by the distortion detecting unit provided in the division member included in the outer cylinder. Therefore, it is unnecessary to separately provide a load cell or the like, and the configuration of the electric cylinder can be simplified. It is unnecessary to provide an output cable or the like that is necessary when the load cell is provided at the distal end of the rod. It is also possible to prevent a deficiency such as rupture of this cable due to repeated bending. Further, since the outer cylinder includes the at least two or more division members and the distortion detecting unit is provided in one division member among the two or more division members, time required for production (manufacturing) of the electric cylinder can be reduced. Therefore, in an apparatus that requires load detection, the electric cylinder according to the aspect of the present invention can be simplifies in a configuration, can be reduced in the length in the axis direction to realize a reduction in the size of the apparatus, and realizes a reduction in a delivery period. The electric cylinder according to the aspect of the present invention can realize flexibility of a configuration in a system including this electric cylinder (a system configuration). In other words, a flexible external configuration of the entire system is realized by a reduction in the length in the axis direction and a reduction in the size of the electric cylinder itself.

DESCRIPTION OF EMBODIMENTS

Figure 1:
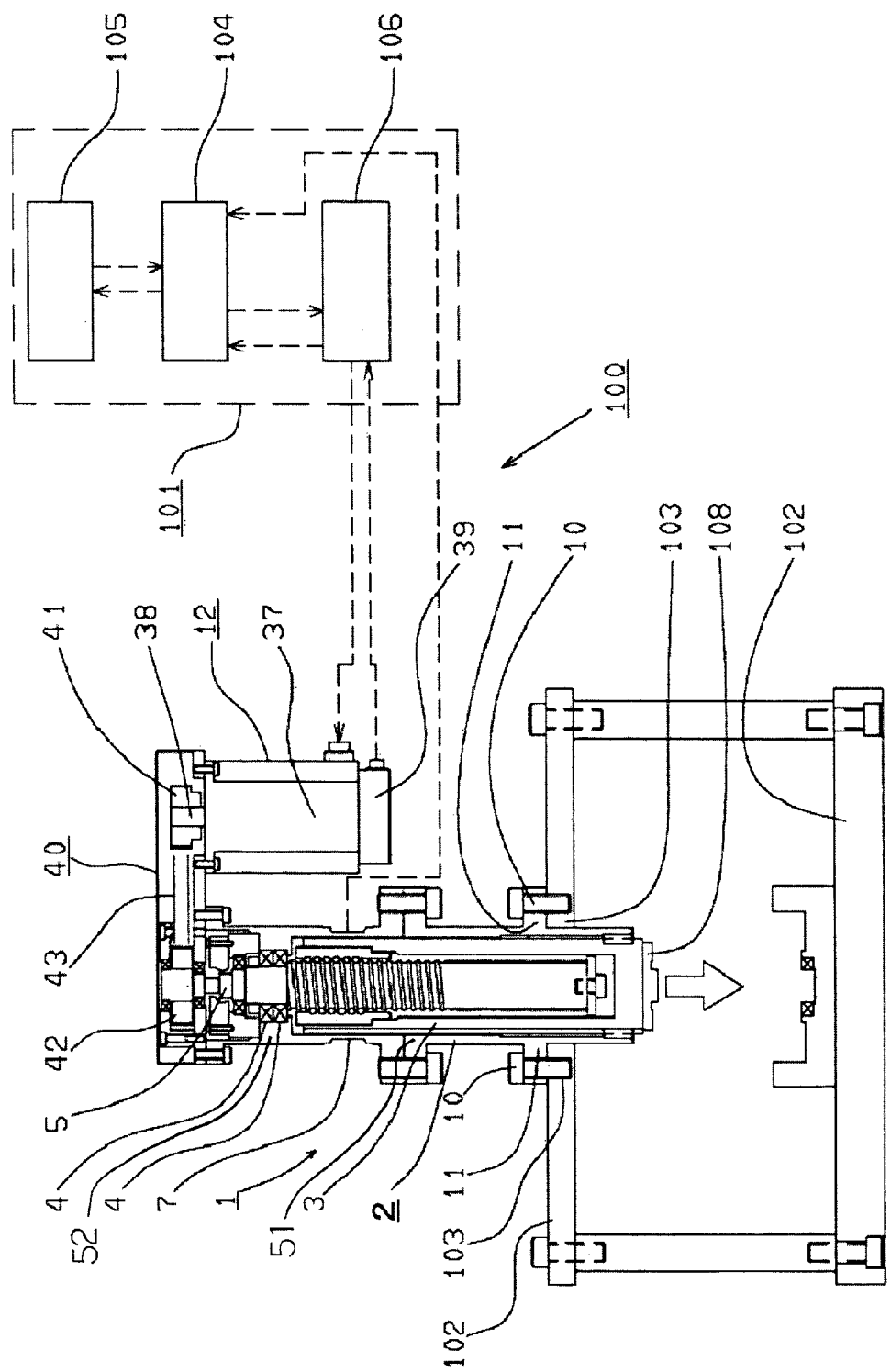
FIG. 1 is a schematic diagram of an electric cylinder system including an electric cylinder according to an embodiment.

An electric cylinder system (an electric servo cylinder system) 100 including an electric cylinder 1 according to an embodiment is explained with reference to the drawings. The electric cylinder system 100 includes, as shown in FIG. 1, an electric cylinder 1, control unit 101 for controlling the electric cylinder, and a system body frame 102 for attaching the electric cylinder 1.

Figure 2:
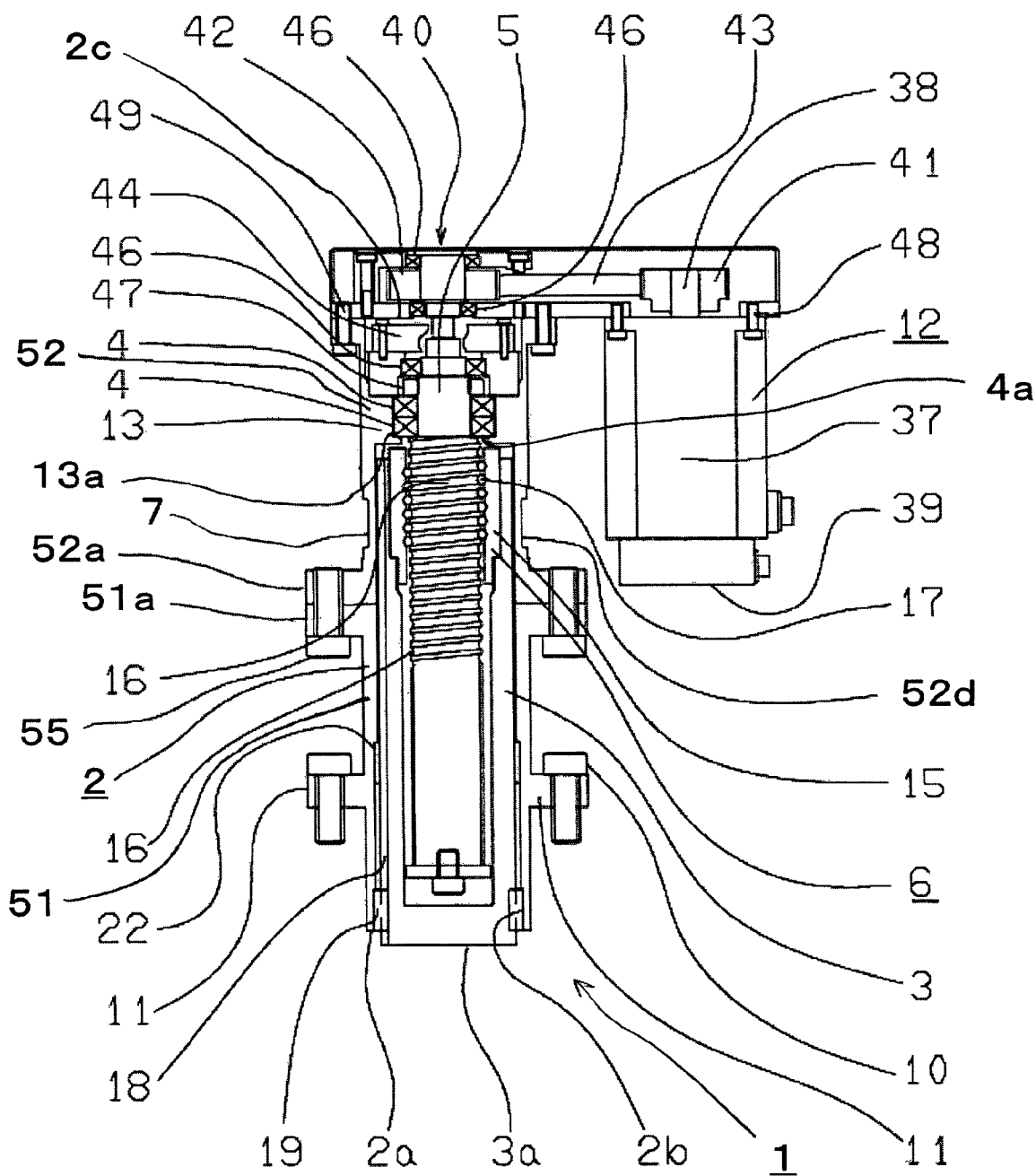
FIG. 2 is a schematic sectional view of the electric cylinder.

The electric cylinder 1 includes, as shown in FIG. 2, an outer cylinder 2, a rod 3, bearings 4, a rotating shaft 5, a screw mechanism 6, and a distortion detecting unit 7. The outer cylinder 2 is, for example, a cylindrical casing and includes, on one end side 2a, a fixing section 11 for fixing to an attachment place of the electric cylinder 1 (an attachment section 103 of the system body frame 102). The outer cylinder 2 includes at least two or more division members that can be divided and combined. The distortion detecting unit 7 is provided in one division member among the two or more division members.

Specifically, for example, the outer cylinder 2 includes a first division member 51 and a second division member 52. The first division member 51 includes a fixing section 11 and is arranged on the one end side 2a. The second division member 52 includes a bearing holding section 13 that holds the bearings 4. Combining sections 51a and 52a such as flanges are fastened by a fastening member 55 such as a screw, whereby the first and second division members 51 and 52 are combined and function as the outer cylinder 2.

Figure 11:
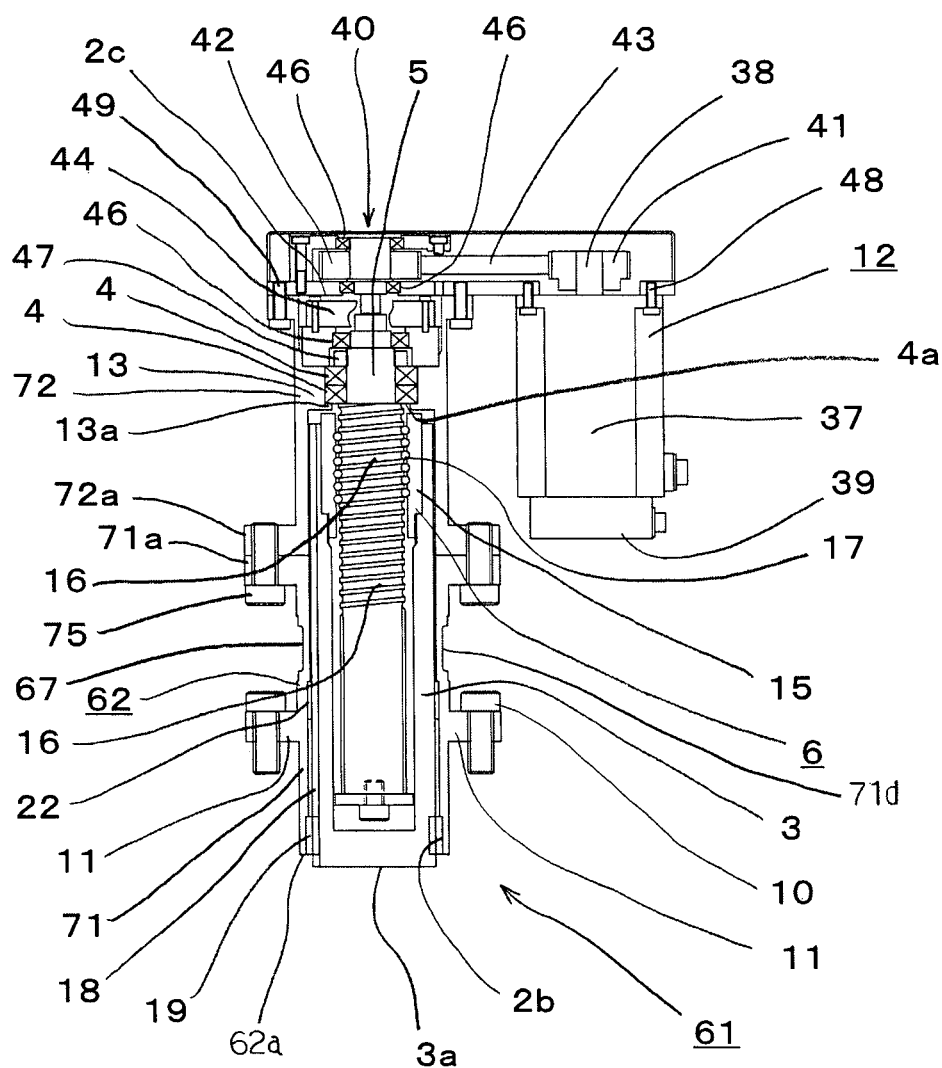
FIG. 11 is a schematic sectional view of another example of the electric cylinder that can be used in the electric cylinder system shown in FIG. 1.

The distortion detecting unit 7 is provided in the second division member 52. The distortion detecting unit may be configured to be provided in the first division member on the one end side 2a as shown in FIG. 11. An example shown in FIG. 11 is explained later.

The fixing section 11 is, for example, a flange. The fixing section 11 is fastened to the attachment section 103 of the frame 102 by screws 10 or the like. The electric cylinder 1 is fixed to the system.

The rod 3 is configured to be capable of expanding and contracting in an axis direction from an opening 2b on one end side (a side on which the one end 2a is provided) of the outer cylinder 2. The expansion and contraction of the rod 3 means that the rod 3 projects to expand in the axis direction from the opening 2b and retracts to the inside from the opening 2b to contract in the axis direction (shrinks in a direction in which a portion projecting from the outer cylinder 2 decreases).

The bearings 4 are provided on the other end side (a side on which the other end 2c is provided) and on the inside of the outer cylinder 2. The rotating shaft 5 is rotatably supported by the bearings 4 and driven to rotate by a driving force of the motor 12. The screw mechanism 6 converts a rotational motion of the rotating shaft 5 into a linear motion of the rod 3 and transmits the linear motion. The distortion detecting unit 7 is provided in a position between a position on the outer circumference of the outer cylinder 2 where the bearings 4 are provided and the fixing section 11.

Specifically, the distortion detecting unit 7 is provided in a position between the end 4a on the fixing section 11 side of the bearings 4 and the fixing section 11. The "end 4a on the fixing section 11 side of the bearings 4" means a portion where the bearings 4 come into contact with a contact section 13a of the bearing holding section 13 that is located on the outer circumference of the bearings 4 and holds the bearings 4. This is because the position in the axis direction of the distortion detecting unit 7 needs to be a position between a position where a force in a tensile direction of the bearings 4 is received and the fixing section 11 and a position between a position where a force in a compression direction of the bearings 4 is received and the fixing section 11. In this embodiment, the bearing holding section 13 is a member integrally provided in the second division member 52 of the outer cylinder 2 and is a member that holds the bearings 4. The bearing holding section is not limited to be integral with the outer cylinder 2 and may be provided separately from the outer cylinder 2.

The distortion detecting unit 7 detects a load in the axis direction applied to a portion between an attachment position of the bearings 4 of the outer cylinder 2 and the fixing section 11 and converts the load into an electric signal. The second division member 52 of the outer cylinder 2 is formed in a thin shape in which the outer diameter of a portion 52d where the distortion detecting unit 7 is attached is set smaller than the outer diameter of the other portions of the second division member 52. The portion where the distortion detecting unit 7 is attached is not limited to the thin shape (the same applies to other distortion detecting units 67, 207, 237, and 267 explained later). The distortion detecting unit 7 may be provided in, for example, a cylindrical member having uniform thickness. Since the second division member 52 is formed in such a thin shape, it is possible to suppress an external dimension small when a protection cover is provided in the portion 52d where the distortion detecting unit 7 is attached. This portion 52d is requested to be formed thick to have a sectional area enough for withstanding thrust and thin enough for detecting, with a distortion gauge, reaction applied to the second division member 52 of the outer cylinder 2. In this viewpoint, it is also convenient to form the second division member 52 in the thin shape.

Figure 3:
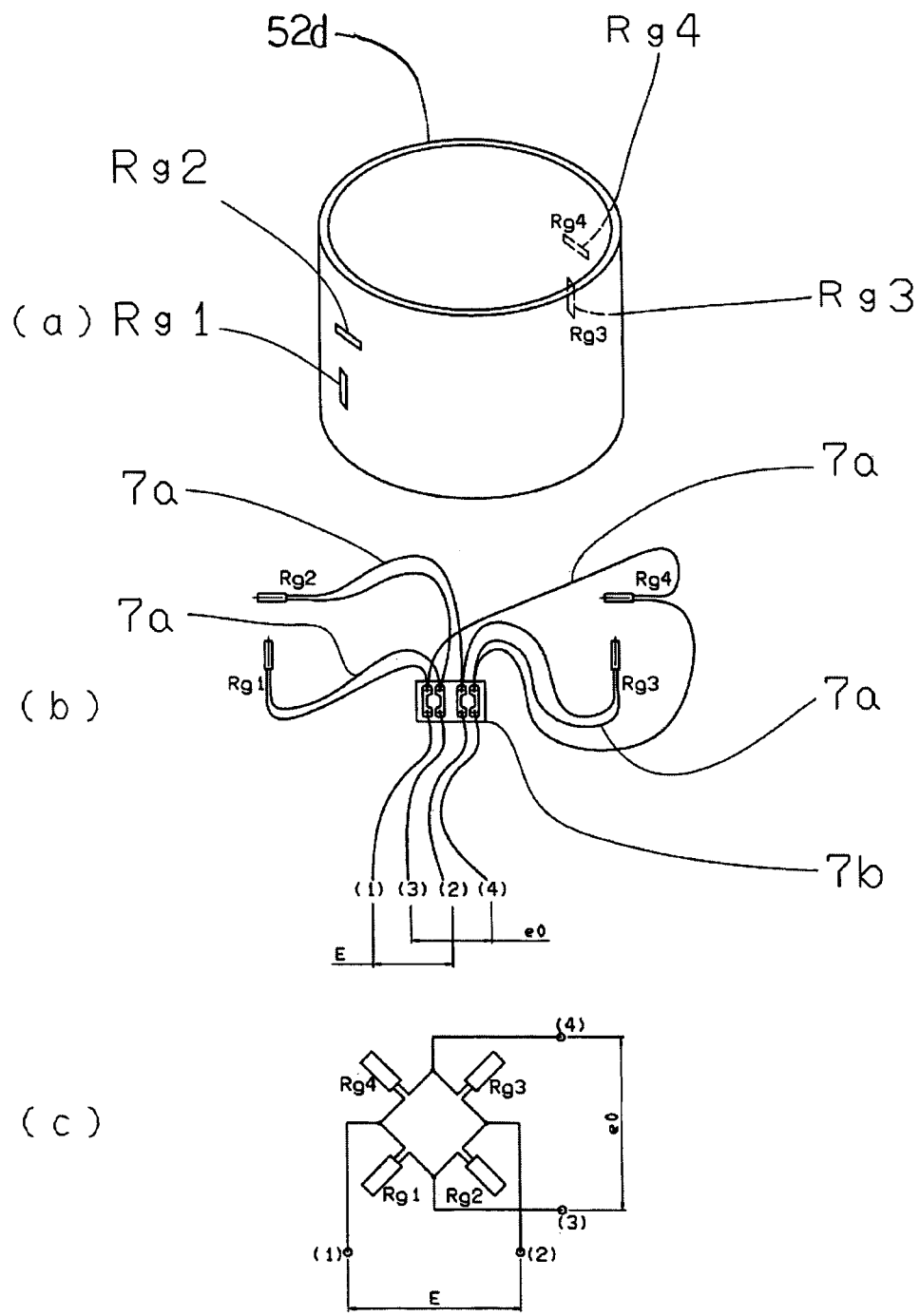
FIG. 3 is a diagram for explaining a distortion detecting unit included in the electric cylinder, wherein (a) is a perspective view showing an example of a state in which distortion gauges are attached to an outer cylinder, (b) is a schematic diagram showing a state of wires that connect the distortion gauges, and (c) is a wiring diagram for indicating that a Wheatstone bridge is formed by the distortion gauges and the wires.

The distortion detecting unit 7 includes, for example, plural distortion gauges Rg 1 to Rg 4 arranged as shown in FIG. 3. In FIG. 3, only the portion 52d for attachment of the detecting unit formed in the thin shape of the second division member 52 of the outer cylinder 2 is shown for easiness of understanding of explanation. Actually, the same members are continuously provided above and below the portion 52d. The distortion detecting unit 7 includes connection wires 7a that connect the distortion gauges Rg 1 to Rg 4 and includes, if necessary, a terminal table 7b. For example, E between (1) and (2) shown in FIG. 3(b) and FIG. 3(c) indicates an applied voltage and e0 between (3) and (4) indicates an output voltage. A Wheatstone bridge is formed by the gauges as shown in FIG. 3(c), whereby a voltage signal proportional to the applied voltage and proportional to distortion is output. The output of the distortion detecting unit 7 is sent to a first controller 104 of the control unit 101 as shown in FIG. 1.

The rod 3 is formed in a cylindrical shape through which the rotating shaft 5 can be inserted. The outer diameter of the rod 3 is formed smaller than the inner diameter of the outer cylinder 2. The screw mechanism 6 is a ball screw. The screw mechanism 6 may be, for example, a trapezoidal screw or a square screw. The trapezoidal screw means a screw in which the cross sections of a male screw and a female screw are trapezoidal. The square screw means a screw in which the cross sections of a male screw and a female screw are rectangular. Besides, a mechanical element that receives a load in the axis direction and converts a rotational motion into a linear motion may be used. In the rod 3 explained herein, a nut member 15 of the screw mechanism 6, which is the ball screw, is integrated. A male screw portion 16 integrated with the rotating shaft 5 configures a ball screw together with the nut member 15 and a ball 17.

Figure 4:
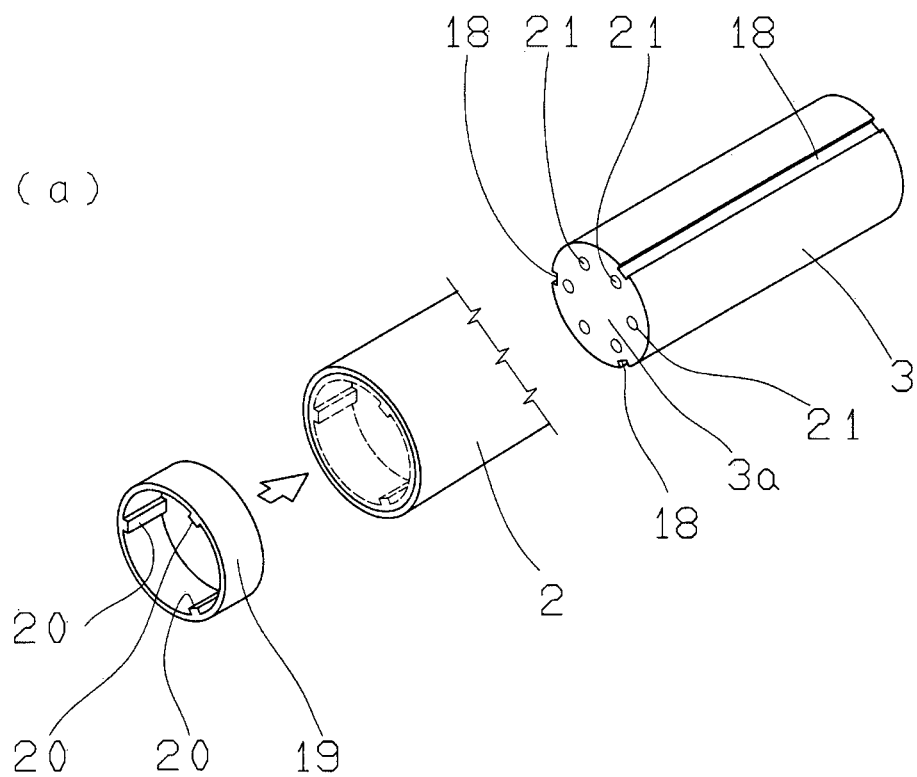
FIG. 4 is a diagram for explaining a member that regulates the rotation of a rod of the electric cylinder, wherein (a) is a perspective view showing a relation between grooves formed on the outer surface of the rod and projections provided in a bush member press-fit with the outer cylinder, (b) is a sectional view of the bush member, the rod, and the outer cylinder, (c) is an enlarged sectional view of the groove and the projection, which are main parts of (b), and (d) is a sectional view of a bush member for swing prevention, a rod, and an outer cylinder.
Figure 4:
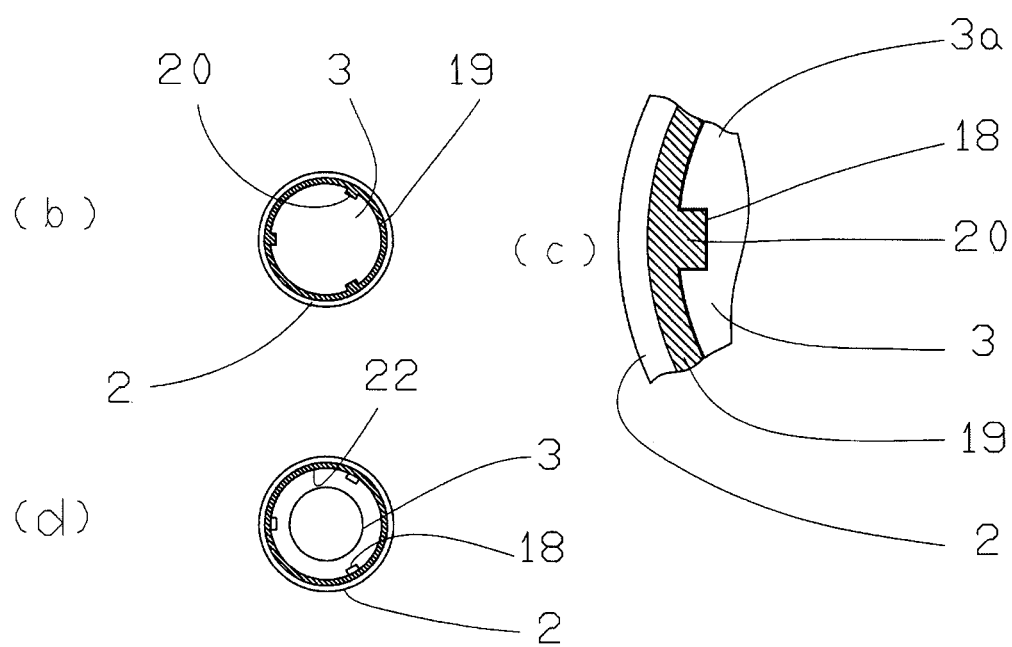

One or plural grooves 18 formed in the axis direction are provided on the outer circumference of an end 3a of the rod 3. As shown in FIG. 4(a), the grooves 18 are provided in three places at equal intervals in the circumferential direction. This end 3a is an end on a side on which the rod 3 projects from the opening 2b on the one end side 2a of the outer cylinder 2. On the other hand, a bush member 19 fit in by press-fitting (interference fit) is attached on the inner side of the opening 2b on the one end side 2a of the outer cylinder 2. On the inner surface of the bush member 19, as shown in FIG. 4(a) and FIG. 4(b), one or plural projections 20 corresponding to the grooves 18 are formed. The projections 20 are provided in three places. The bush member 19 assumes a shape including the projections 20 formed in the axis direction on the inner surface of a cylinder. The projections 20 engage with the grooves 18 to regulate the rotation of the rod 3. Between the projections 20 and the grooves 18, as shown in FIG. 4(c), a very small gap enough for allowing the rod 3 to slide in the axis direction with respect to the outer cylinder 2 is formed. Similarly, between the inner surface of the bush member 19 and the outer surface of the rod 3, a very small gap enough for allowing the rod 3 to slide in the axis direction with respect to the outer cylinder 2 is formed. As shown in FIG. 4(a), bolt holes 21 for attaching a jig (e.g., a press-fitting jig 108 shown in FIG. 1) are provided according to necessity of the configuration of the electric cylinder system 100.

The bush members 19 explained with reference to FIGS. 4(a) to 4(c) is a bush member for rotation regulation. Further, a bush member 22 for swing prevention is provided in the outer cylinder 2 (the first division member 51). As shown in FIG. 4(d), this bush member 22 is fowled in a cylindrical shape and fit in the outer cylinder 2 by press-fitting. Between the inner surface of the bush member 22 and the outer surface of the rod 3, a very small gap enough for allowing the rod 3 to slide with respect to the outer cylinder 2 is formed. As shown in FIG. 2, the bush member 19 and the bush member 22 are arranged a predetermined distance apart from each other. The bush member 19 and the bush member 22 prevent the rod 3 from swinging to tilt with respect to the axis. If the rod 3 swings, the function of the screw mechanism 6 cannot be displayed. In other words, an unnecessary force is generated in a ball screw section. Further, a problem is likely to occur in that uneven wear or the like occurs in components of the ball screw section and the screw mechanism is damaged. The bush member 19 and the bush member 22 prevent such problems. As explained above, the bush member 19 has both a rotation regulating function and a swing preventing function.

Figure 5:
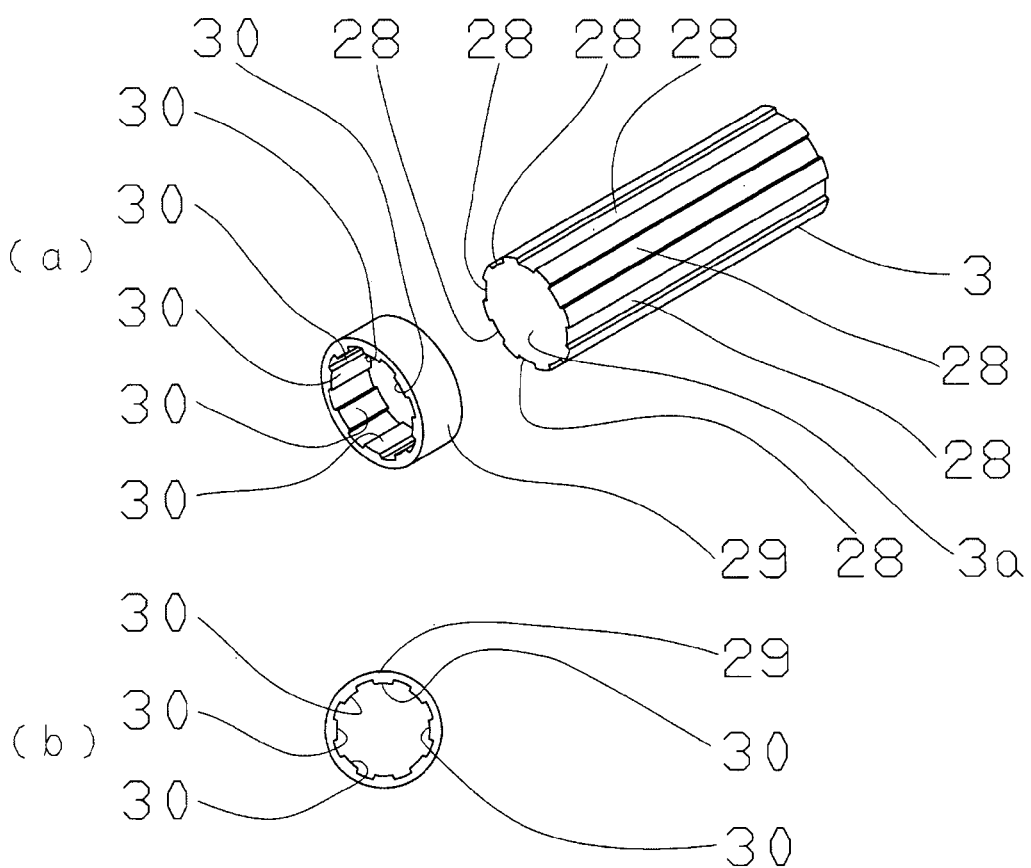
FIG. 5 is a diagram showing another example of the member that regulates the rotation of the rod of the electric cylinder and is a diagram of an example in which grooves and projections of a spline shape are adopted, wherein (a) is a perspective view showing a relation between grooves formed on the outer surface of the rod and projections provided in a bush member press-fit with the outer cylinder in this modification and (b) is a sectional view of the bush member shown in (a).

The configurations of the bush member for rotation regulation and the grooves included in the electric cylinder 1 are not limited to the configurations explained above. For example, a bush member including grooves and projections of a spline shape such as a square spline of JIS (Japanese Industrial Standards) B1601, an involute spline of JIS B1603, or a ball spline of JIS B1193 may be configured. For example, the electric cylinder 1 may be configured to include grooves 28 and a bush member 29 shown in FIG. 5 instead of the grooves 18 and the bush member 19 explained above. As shown in FIG. 5(a), like the grooves 18, the grooves 28 are provided in the axis direction from the end 3a on the outer circumference of the rod 3. The grooves 28 are provided in eight places at equal intervals in the circumferential direction. As shown in FIG. 5(a) and FIG. 5(b), plural projections 30 corresponding to the grooves 28 are formed on the inner surface of the bush member 29 press-fit in the outer cylinder 2. In this embodiment, the projections 30 in the eight places are provided and engage with the grooves 28 to regulate the rotation of the rod 3. Appropriate gaps are formed between the projections 30 and the grooves 28. An appropriate gap is also fixated between the inner surface of the bush member 29 and the outer surface of the rod 3. The rod 3 is allowed to slide in the axis direction with respect to the outer cylinder 2.

Figure 6:
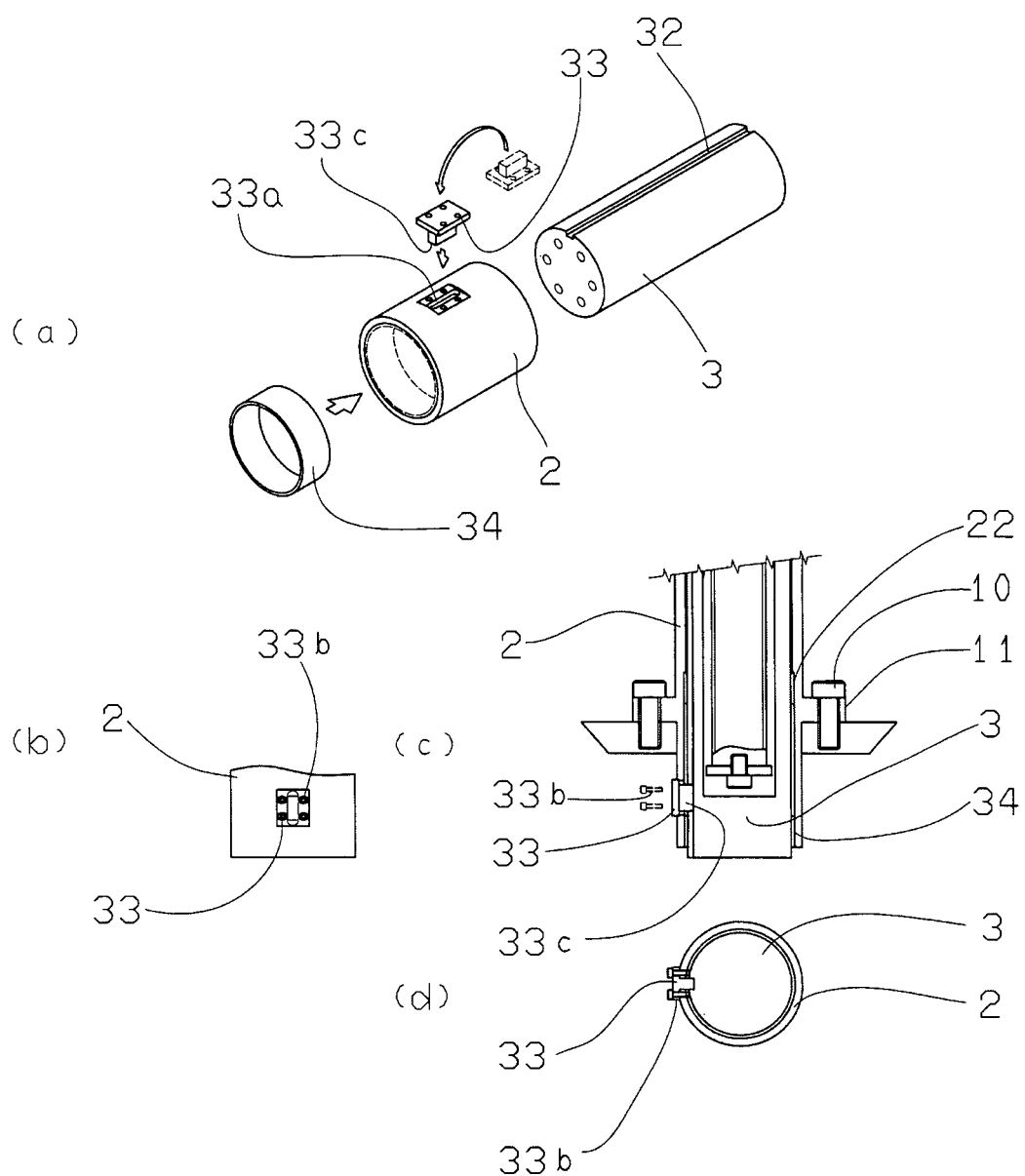
FIG. 6 is a diagram showing another example of the structure for regulating the rotation of the rod of the electric cylinder and is a diagram of an example in which a structure including a slip key is adopted, wherein (a) is a perspective view showing a relation between a groove formed on the outer surface of the rod and a key member in this modification, (b) is a side view showing this key member and an outer cylinder, (c) is a sectional view from a front direction showing a relation among this key member, the outer cylinder, and a rod member, and (d) is a sectional view in a direction from a rod distal end side to a proximal end side showing a relation between this key member and the outer cylinder.

A rotation regulating mechanism included in the electric cylinder 1 is not limited to the bush structures in which the bush members 19 and 29 are used. The rotation regulating mechanism may be a structure in which a slip key shown in FIG. 6 is used. Specifically, the rotation regulating mechanism may be configured to include a groove 32 and a key member 33 instead of the grooves 18 and the bush member 19. When the rotation regulating mechanism is the slip key structure, it is necessary to provide a cylindrical bush member 34 having only a swing preventing function same as that of the bush member 22. The key member 33 is attached to an opening 33a, which is provided in the outer cylinder 2, by a screw member 33b. The key member 33 includes a projection 33c that projects to the groove 32 side when the key member 33 is attached to the outer cylinder 2. The projection 33c engages with the groove 32 to regulate the rotation of the rod 3. A very small gap enough for allowing the rod 3 to slide in the axis direction with respect to the outer cylinder 2 is formed between the projection 33c and the groove 32.

Figure 7:
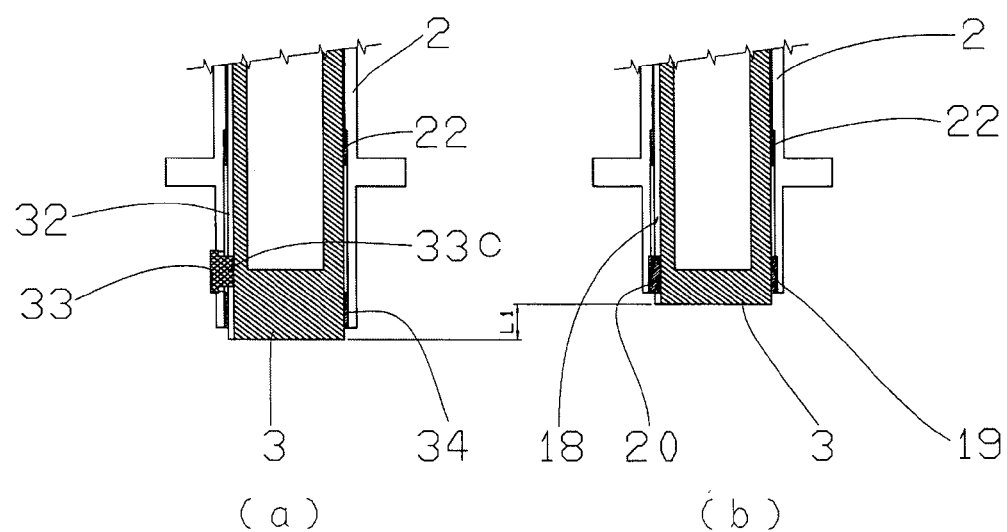
FIG. 7 is a diagram for comparing a rotation regulating mechanism of a bush structure shown in FIGS. 4 and 5 and a rotation regulating mechanism of a slip key structure shown in FIG. 6, wherein (a) is a sectional view showing the rotation regulating mechanism of the slip key structure shown in FIG. 6 and (b) is a sectional view showing the rotation regulating mechanism of the bush structure shown in FIG. 4.

In the rotation regulating mechanism, the bush structures including the bush members 19 and 29 are advantageous from a viewpoint of reducing the length in the axis direction of the electric cylinder 1 and a viewpoint of simplification of a configuration compared with the slip key structure in which the key member 33 is used. This point is explained with reference to FIG. 7. When the slip key structure is adopted (when the key member 33 or the like is used) as shown in FIG. 7(a), in the groove 32 provided in the rod 3, the portion of the bush member 34 for swing prevention cannot be used for rotation regulation. On the other hand, when the bush structure is adopted (when the bush member 19 and the like are used) as shown in FIG. 7(b), the groove 18 provided in the rod 3 can be used for rotation regulation up to the distal end thereof. Therefore, when the bush structure is used, a dimension in the axis dimension can be reduced by L1 shown in FIG. 7.

Incidentally, the motor 12 includes a motor body 37, an output shaft 38, and an encoder 39. The electric cylinder 1 includes a transmitting mechanism 40 that transmits the torque of the output shaft 38 of the motor 12 to the rotating shaft 5. The transmitting mechanism 40 includes a timing pulley 41 connected to the output shaft 38, a timing pulley 42 connected to the rotating shaft 5, and a timing belt 43 wound around the timing pulleys 41 and 42. The transmitting mechanism 40 can transmit the torque of the output shaft 38 to the rotating shaft 5. When the torque is transmitted to the rotating shaft 5, the rotating shaft 5 can be decelerated or accelerated at desired deceleration by changing a relation between the sizes of the diameters of the timing pulleys 41 and 42. The rotating shaft 5 is configured to receive a force in the rotating direction with plural bearings 46 in the outer cylinder 2 (the bearing holding section 13) and the transmitting mechanism 40. The bearings 46 are so-called radial bearings. On the other hand, the bearings 4 explained above are configured to receive thrust applied to the rotating shaft 5. The bearings 4 are so-called thrust bearings and integrated with the rotating shaft 5 by a bearing nut 47. The bearings 4 are fit in the bearing holding section 13.

The motor 12 is arranged to set the output shaft 38 parallel to the rotating shaft 5 and is provided in a position where the output shaft 38 is orthogonal to the axis direction with respect to the outer cylinder 2. Specifically, the motor 12 is arranged such that the output shaft 38 and the rotating shaft 5 do not coincide with each other and form a U shape as a whole. In other words, the rotating shaft 5 and the output shaft 38 are arranged to be faced the same direction with respect to the transmitting mechanism 40. Therefore, the outer cylinder 2 and the motor body 37 can be arranged in positions overlapping in the axis direction. In other words, a dimension in the axis direction of the entire apparatus can be reduced. In the electric cylinder 1, without providing the transmitting mechanism 40, the output shaft 38 and the rotating shaft 5 may be arranged to coincide with each other (to be located on extended lines each other) and arranged to form an I shape as a whole. In this case, the transmitting mechanism 40 is unnecessary. However, the dimension in the axis direction of the entire apparatus can be set smaller in the electric cylinder explained with reference to FIG. 2.

The electric cylinder is advantageous from this viewpoint. The motor 12 and the transmitting mechanism 40 are fixed to be integrated by bolts 48. The outer cylinder 2 and the transmitting mechanism 40 are fixed to be integrated by bolts 49.

A reduction gear 44 is arranged between the rotating shaft 5 and the transmitting mechanism 40. Since the electric cylinder 1 includes the reduction gear 44, the electric cylinder 1 can rotate the rotating shaft 5 at desired force and speed and insert and pull out the rod 3 at desired thrust and speed. If the electric cylinder 1 depends only on deceleration of the transmitting mechanism 40, it is likely that the pulleys of the transmitting mechanism are increased in size and the entire apparatus is excessively increased in size. However, since the electric cylinder 1 includes the reduction gear 44, it is possible to solve such a problem and enable a reduction in the size of the apparatus. The reduction gear can be arranged between the motor 12 and the transmitting mechanism 40 as well. However, effects explained below are obtained by arranging the reduction gear between the rotating shaft 5 and the transmitting mechanism 40 as shown in FIG. 2. Specifically, when the reduction gear is arranged on the motor 12 side, an end (in FIG. 2, the lower end) of the motor 12 is set closer to the system body frame 102 side of the electric cylinder system 100. For convenience of the entire system, in some case, it is desired to perform a design change to move the fixing section 11, which is the attachment section of the outer cylinder 2, to the transmitting mechanism 40 side (in FIG. 2, the upper side). However, when the reduction gear is arranged on the motor 12 side, the motor 12 interferes with the body frame 102 and the design change cannot be performed. In other words, a degree of freedom of the entire system falls. In the electric cylinder 1 shown in FIG. 2, since the reduction gear 44 is arranged between the rotating shaft 5 and the transmitting mechanism 40, it is possible to prevent the problem, i.e., it is possible to improve a degree of freedom of the entire system of the electric cylinder system 100.

Figure 8:
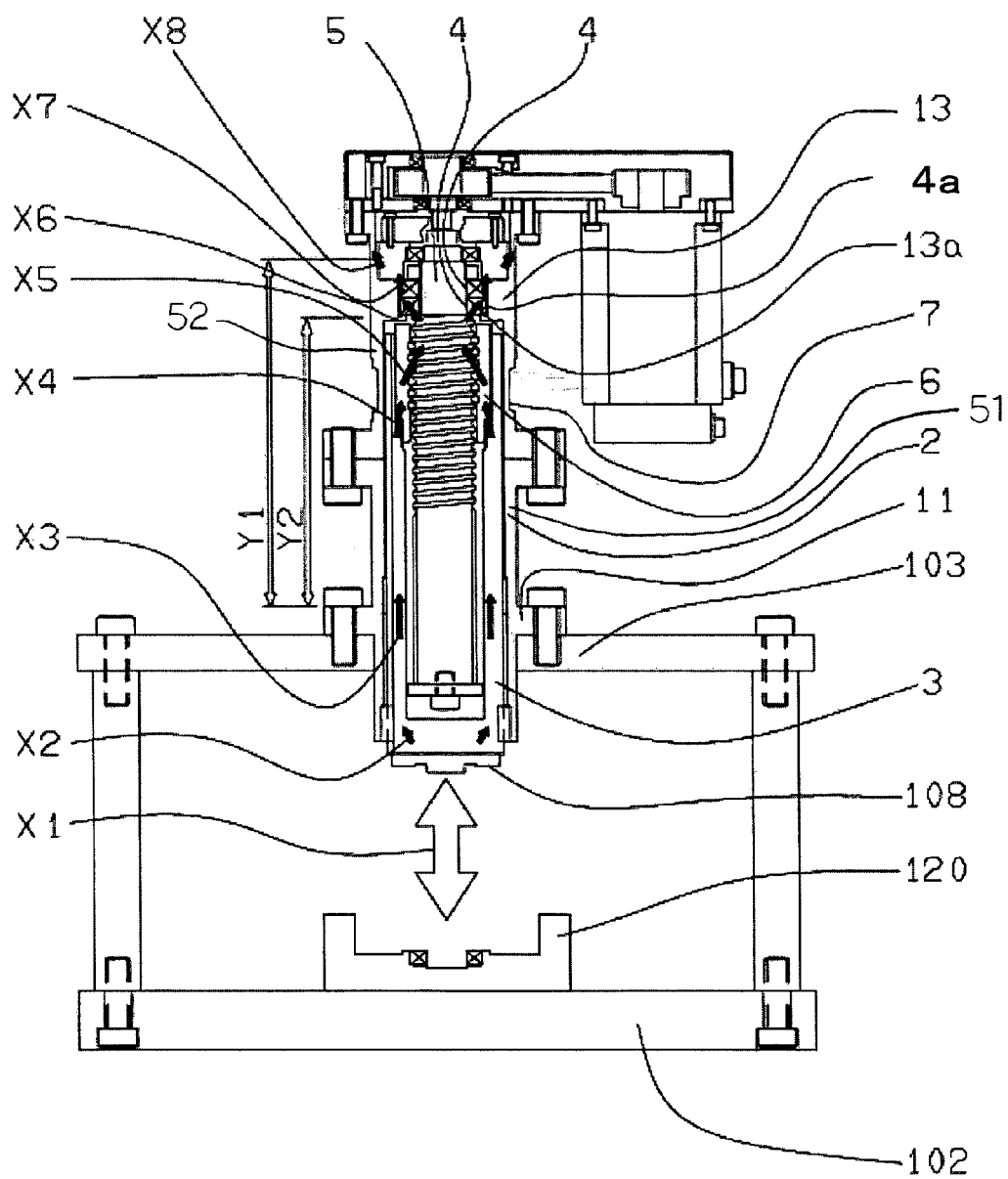
FIG. 8 is a diagram for explaining a range in which a load in the axis direction applied to the rod as reaction is transmitted from the rod through a screw mechanism.

With the electric cylinder 1 explained above, for example, as shown in FIG. 8, when a work piece 120 is pressed, a pressing load X1 of the pressing changes to reaction and is transmitted through the members as indicated by arrows X2 to X8. A tensile force is generated in a portion indicated by an arrow Y1 of the outer cylinder 2 fixed in the fixing section 11. When the electric cylinder 1 is used to apply a force in a direction opposite to the direction in FIG. 8, the reaction is transmitted through the members in portions indicated by arrows X2 to X5. The reaction is transmitted from the end 4a on the fixing section 11 side of the bearings 4 in a downward direction in the figure to the contact sections 13a of the bearing holding section 13. A compression force is generated in a portion indicated by an arrow Y2 of the outer cylinder 2 fixed in the fixing section 11. As shown in FIG. 2, the distortion detecting unit 7 is located on the outer side of the nut member 15 of the ball screw as shown in FIG. 2, i.e., provided in a position between the end 4a on the fixing section 11 side of the bearings 4 and the fixing section 11. Therefore, the distortion detecting unit 7 can detect a load (reaction) in the axis direction applied to the rod 3 when a range in which the tensile force indicated by Y1 is applied is taken into account and when a range in which the compression force indicated by Y2 is applied is taken into account.

In the electric cylinder 1, in view of the structure peculiar to the electric cylinder, i.e., in view of the fact that an external force other than the reaction is not generated in the outer cylinder 2, the distortion detecting unit 7 may be provided in a portion where both of the tensile force and the compression force of the outer cylinder 2 are applied as reaction. In other words, the outer cylinder 2 functioning as the casing is also used as the attachment section of the distortion detecting unit to realize simplification of the configuration of the electric cylinder 1 and load detection in the axis direction.

As explained above, the electric cylinder 1 includes the outer cylinder 2, the rod 3, the bearings 4, the rotating shaft 5, the screw mechanism 6, and the distortion detecting unit 7 and the load detection can be performed by the distortion detecting unit 7 provided in the outer cylinder 2 (the second division member 52). Therefore, it is unnecessary to separately provide a load cell or the like and simplification of the configuration of the electric cylinder 1 can be realized.

In the electric cylinder 1, it is also unnecessary to provide, for example, an output cable that is necessary when the load cell is provided at the distal end of the rod (an output cable having a sag such that an end on a movable side moves together with the distal end of the rod). A deficiency such as rupture due to repeated bending of this cable can also be prevented. Therefore, when the load detection is necessary, the electric cylinder 1 can be simplified in the configuration and is reduced in the length in the axis direction to realize a reduction in the size of the apparatus.

Further, the electric cylinder 1 can realize flexibility of the configuration in the electric cylinder system 100 including the electric cylinder 1 (the system configuration). In other words, a flexible external configuration of the entire system is realized by a reduction in the length in the axis direction and a reduction in the size of the electric cylinder itself.

Furthermore, in the electric cylinder 1, the outer cylinder 2 may include the first and second division members 51 and 52 that can be divided and combined and the distortion detecting unit 7 may be provided in one division member (the second division member 52) of the first and second division members. In this way, the electric cylinder 1 realizes "a reduction in a delivery period" because the two-division system is adopted. Concerning this point, the two-division system is compared with a single member system not including a division member and explained with reference to FIGS. 9 and 10.

Figure 9:
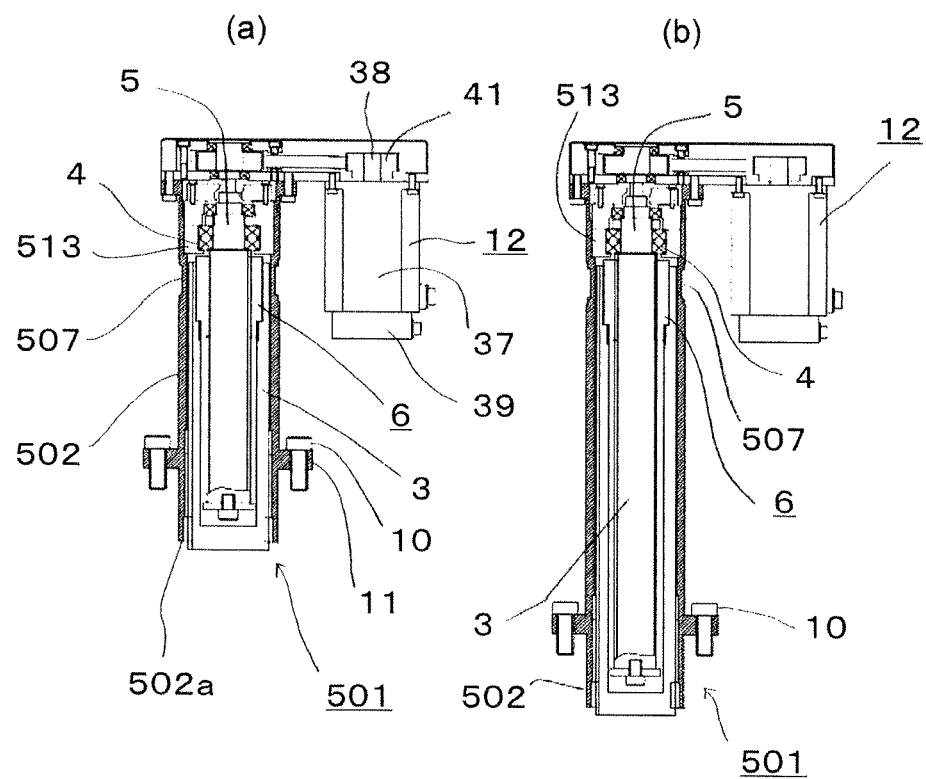
FIG. 9 is a diagram showing a comparative example (a single member system) to be compared with an electric cylinder of a division system in order to explain advantageous points of the electric cylinder of the division system, wherein (a) is a schematic sectional view of an electric cylinder of the comparative example (the single member system) and (b) is a schematic sectional view in the case in which a rod stroke is long in the comparative example.
Figure 10:
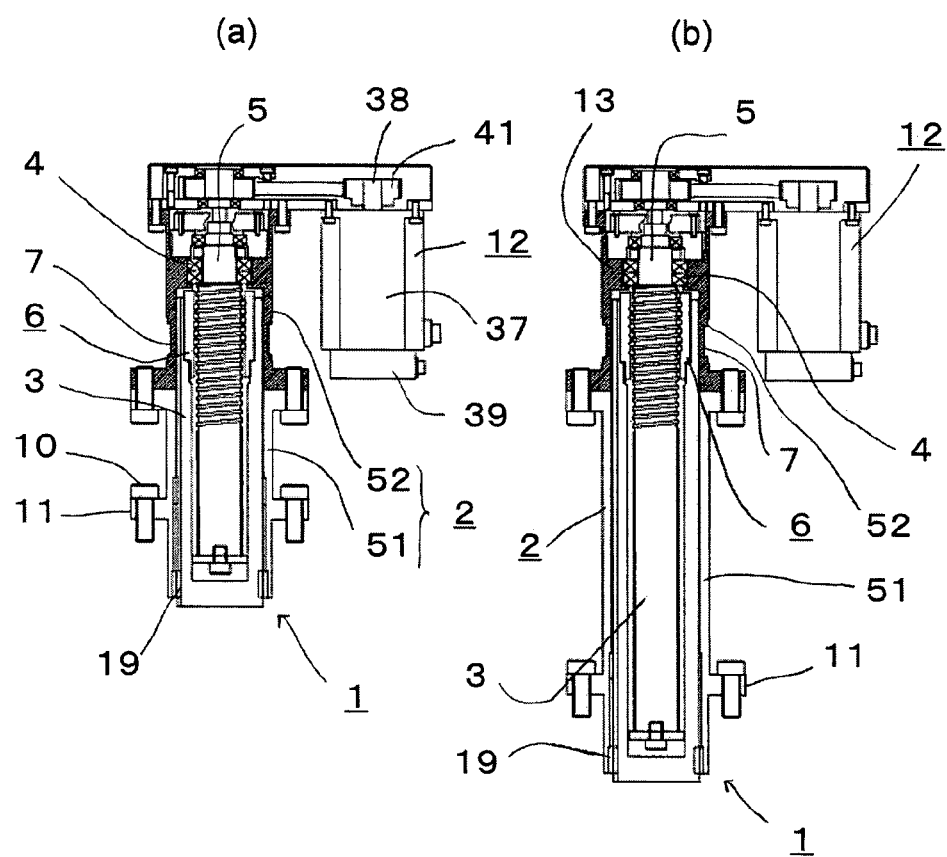
FIG. 10 is a diagram for explaining advantageous points of the electric cylinder of the division system, wherein (a) is a schematic sectional view of the electric cylinder (a standard stroke) of the embodiment (a two-division system) shown in FIG. 2 and (b) is a schematic sectional view in the case in which a rod stroke is long in the embodiment.

An electric cylinder 501 shown in FIG. 9 is a comparative example. An outer cylinder 502 adopts the single member system. The electric cylinder 501 has a configuration same as the configuration of the electric cylinder 1 except that the system of the outer cylinder 502 is different and a bearing holding member 513 is provided separately from the outer cylinder 502. Therefore, the same components are denoted by the same reference numerals and signs and detailed explanation of the components is omitted. The electric cylinder 501 includes, as shown in FIG. 9, an outer cylinder 502, the rod 3, the bearings 4, the rotating shaft 5, the screw mechanism 6, and a distortion detecting unit 507.

The outer cylinder 502 is, for example, a cylindrical casing. The outer cylinder 502 includes, on one end side 502a, the fixing section 11 for fixing to an attachment place of the electric cylinder 501 (the attachment section 103 of the system body frame 102). The outer cylinder 502 is shaved off from a metal material to thereby be formed of a so-called integral object (a single member) including the fixing section 11. The distortion detecting unit 507 is configured the same as the distortion detecting unit 7.

Like the electric cylinder 1, the electric cylinder 501 shown in FIG. 9 can be simplified in a configuration and reduced in the length in the axis direction to realize a reduction in the size of the apparatus. However, when a delivery period is taken into account, problems explained below occur. Manufacturing of the outer cylinder 502 includes a manufacturing step for the outer cylinder 502 itself and a step of sticking a distortion gauge functioning as the distortion detecting unit 507 to this outer cylinder 502. Since these steps need to be separately performed, a manufacturing schedule for the outer cylinder 502 is long compared with the other components. If a stroke (variable length of the rod) is a standard specification, the manufacturing schedule can be reduced if this outer cylinder 502 is kept in stock. However, for example, in the case of an electric cylinder of a long stroke specification shown in FIG. 9(b) or, conversely, an electric cylinder of a short stroke specification, it is unrealistic to keep stocks to correspond to all lengths and it is difficult to reduce the manufacturing schedule. Therefore, a manufacturing schedule until completion is long and it is difficult to reduce a delivery period.

On the other hand, in the case of the electric cylinder 1 shown in FIG. 2, as shown in FIG. 10(a) and FIG. 10(b), even when strokes are different, if the length of the second division member 52 in which the distortion detecting unit 7 is provided is set the same, a delivery period can be reduced by keeping this second division member 52 in stock. In other words, since only the first division member 51, the ball screw shaft, and the rod on the distal end side have to be manufactured according to a stroke, manufacturing steps for the components can be reduced. This is because this first division member 51 originally has a short delivery period compared with the second division member 52 including the distortion detecting unit 7. As explained above, in the electric cylinder 1, the outer cylinder 2 includes the at least two or more division members 51 and 52 and the distortion detecting unit is provided in one division member 52 of the two or more division members. Therefore, time required for production (manufacturing) of the electric cylinder can be reduced.

In the case of the electric cylinder 1, there is also an advantage that, even when a deficiency occurs in the load cell, only the second division member 52 has to be changed. Further, there is an advantage that, even when the bush member 19 for rotation regulation or the like wears and a deficiency occurs, only the first division member 51 has to be changed. Although the number of components increases because the outer cylinder 2 includes the two members, since the lengths of the respective members (the first and second division members 51 and 52) are reduced, manufacturing is easy. In this way, the electric cylinder 1 can realize a reduction in a delivery period and realize a reduction in maintenance and repairing costs.

Next, the electric cylinder system 100 including this electric cylinder 1 is explained. As shown in FIG. 1, a control unit 101 provided in the electric cylinder system 100 includes a first controller 104 that receives a detection signal from the distortion detecting unit 7, a second controller 105 that performs an operation instruction according to a peripheral apparatus and a work state, and a motor driver 106 that drive-controls the motor 12 and receives a signal from the encoder 39 of the motor 12.

The motor driver 106 performs rotation control (rotation command) for the motor 12 on the basis of a command of an operation condition from the first controller 104. The motor driver 106 receives a signal of the number of encoder pulses from the encoder 39 and transmits various kinds of information concerning the motor 12 including this received information to the first controller 104. The first controller 104 receives the information from the encoder 39 and receives a detection output signal of a load in the axis direction applied to the rod 3, i.e., an output proportional to the load (thrust) from the distortion detecting unit 7. The second controller 105 is a programmable logic controller. The second controller 105 receives various kinds of information from the first controller 104 and issues, for example, an operation instruction according to a peripheral apparatus, to which components are inserted and from which components are removed, and a work state to the first controller 104. The first controller 104 monitors, at any time, the position of the rod 3 and a load in the axis direction applied to the rod 3, sets and calculates an operation condition of the next control cycle, and performs instruction (control) for the motor driver 106. As explained above, the control unit 101 controls the electric cylinder 1 on the basis of the signal from the encoder 39 of the motor 12 and the signal from the distortion detecting unit 7 functioning as load detecting means (a load detecting unit).

The electric cylinder system 100 includes the electric cylinder 1 and the control unit 101 for controlling the electric cylinder 1. The electric cylinder 1 includes, as explained above, the outer cylinder 2, the rod 3, the bearings 4, the rotating shaft 5, the screw mechanism 6 that converts a rotational motion of the rotating shaft 5 into a linear motion of the rod 3 and transits the linear motion, and the distortion detecting unit 7 functioning as the load detecting means for detecting a load in the axis direction applied to the rod 3 in a position where the load is transmitted from the rod 3 through the screw mechanism 6. The control unit 101 may be configured to control the electric cylinder 1 on the basis of a signal from the encoder 39 of the motor 1 and a signal from the load detecting means (the distortion detecting unit 7). The electric cylinder system 100 makes the system configuration simple and flexible and realizes execution of load detection and position detection.

Specifically, in the electric cylinder system 100, the distortion detecting unit 7 functioning as the load detecting means detects a load in the axis direction applied to the rod 3 in a position where the load is transmitted from the rod 3 through the screw mechanism 6. Therefore, it is unnecessary to provide a load cell at the distal end of the rod 3 and the configuration of the electric cylinder system 100 can be simplified. In other words, rather than providing the load detecting means in the rod 3 that performs an expanding and contracting action, the load detecting means may be provided on the outer cylinder 2 side, which can also be considered a fixed side. It is also unnecessary to provide an output cable or the like that is necessary when the load cell is provided at the distal end of the rod. It is also possible to prevent a deficiency such as rupture of this cable due to repeated bending. Therefore, in a system that requires load detection and position detection, the configuration of the system can be simplified and a reduction in the size of the system is realized. Flexibility of a system configuration and a flexible external configuration of the entire system are realized.

Since the electric cylinder 1 is used in the electric cylinder system 100, the electric cylinder system 100 also has the advantageous effects of the electric cylinder 1 itself explained above. An electric cylinder used in this electric cylinder system 100 is not limited to the electric cylinder 1 explained above. An electric cylinder 61 shown in FIG. 11 may be used.

Next, the electric cylinder 61 that can be used in the electric cylinder system 100 is explained. The electric cylinder 61 is the same as the electric cylinder 1 except that a distortion detecting unit 67 is provided in a first division member 71 on the distal end side (one end side 62a).

Therefore, the same sections (components) are denoted by the same reference numerals and signs and detailed explanation of the sections is omitted.

Specifically, the electric cylinder 61 includes, as shown in FIG. 11, an outer cylinder 62, the rod 3, the bearings 4, the rotating shaft 5, the screw mechanism 6, and a distortion detecting unit 67. The outer cylinder 62 includes a first division member 71 and a second division member 72. The first division member 71 includes the fixing section 11 and is arranged on one end side 62a. The second division member 72 includes the bearing holding section 13 that holds the bearings 4. Combining sections 71a and 72a such as flanges are fastened by a fastening member 75 such as a screw, whereby the first and second division members 71 and 72 are combined and function as the outer cylinder 62.

The distortion detecting unit 67 is provided in the first division member 71. The distortion detecting unit 67 has a configuration same as the configuration of the distortion detecting unit 7 explained above except that the distortion detecting unit 67 is provided in the first division member 71. The first division member 71 of the outer cylinder 62 is formed in a thin shape in which the outer diameter of a portion 71d where the distortion detecting unit 67 is attached is set smaller than the outer diameter of the other portions of the first division member 71.

As explained above, the electric cylinder 61 includes the outer cylinder 62, the rod 3, the bearings 4, the rotating shaft 5, the screw mechanism 6, and the distortion detecting unit 67. Load detection can be performed by the distortion detecting unit 67 provided in the outer cylinder 62 (the first division member 71). Therefore, it is unnecessary to separately provide a load cell or the like and simplification of the configuration of the electric cylinder 61 can be realized.

Further, the electric cylinder 61 is reduced in the length in the axis direction to realize a reduction in the size of the apparatus, realizes a reduction in a delivery period, and realizes a flexible external configuration of the electric cylinder system 100. Since the distortion detecting unit 67 is present in the first division member 71 on the distal end side, labor for replacement is little.

An electric cylinder used in the electric cylinder system 100 is not limited to the two-division system in the electric cylinders 1 and 61, and may be a three-division system. For example, the electric cylinder may be electric cylinders 201, 231, and 261 shown in FIGS. 12 to 14. Next, the electric cylinders 201, 231, and 261 are explained. However, since the electric cylinders 201, 231, and 261 are the same as the electric cylinder 1 explained above except that the three-division system is adopted, the same sections (components) are denoted by the same reference numerals and signs and detailed explanation of the sections is omitted.

Figure 12:
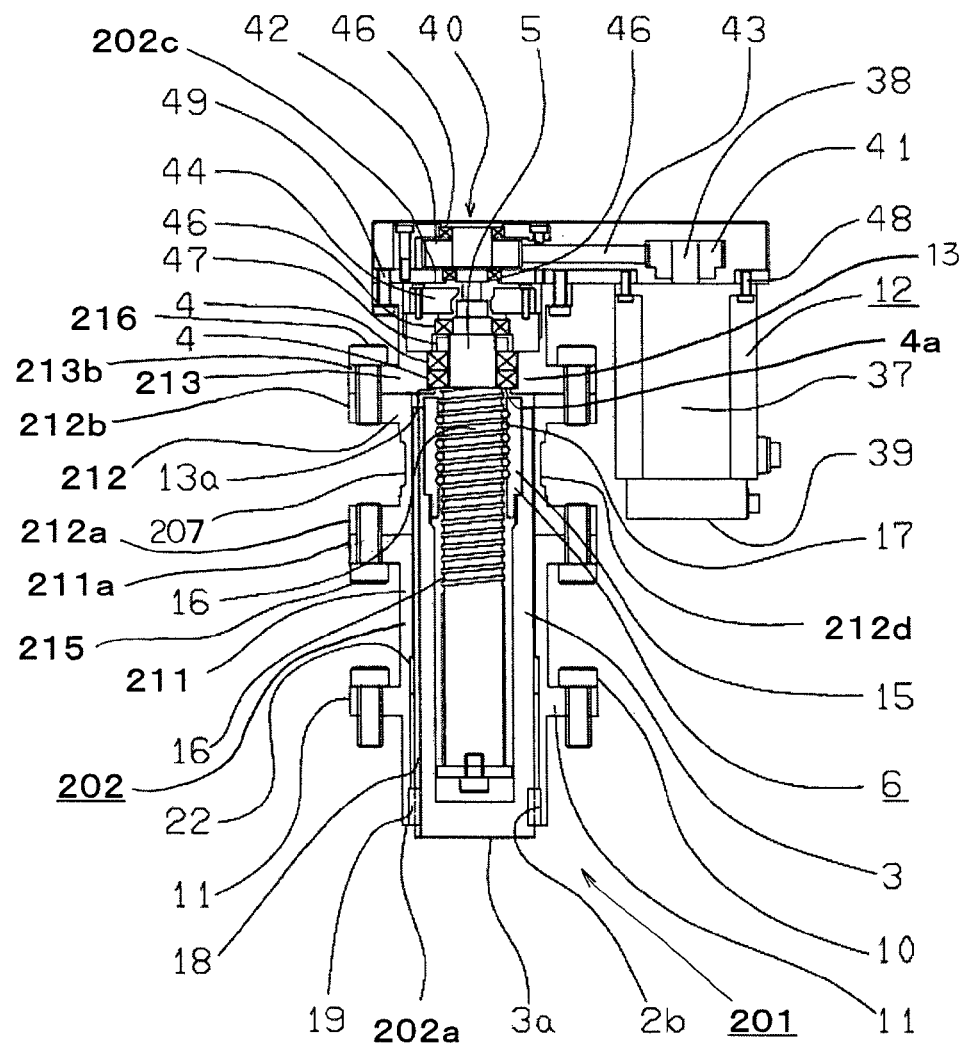
FIG. 12 is a schematic sectional view of still another example of the electric cylinder that can be used in the electric cylinder system shown in FIG. 1 and a schematic sectional view of an electric cylinder of a three-division system.

The electric cylinder 201 shown in FIG. 12 includes an outer cylinder 202, the rod 3, the bearings 4, the rotating shaft 5, the screw mechanism 6, and a distortion detecting unit 207. The outer cylinder 202 includes at least two or more division members that can be divided and combined. The distortion detecting unit 207 is provided in one division member among the two or more division members.

Specifically, for example, the outer cylinder 202 includes a first division member 211, a second division member 212, and a third division member 213. The first division member 211 includes the fixing section 11 and is arranged on one end side 202a. The third division member 213 includes the bearing holding section 13, which holds the bearings 4, and is arranged on the other end side 202c. The second division member 212 is arranged between the first division member 211 and the third division member 213.

Combining sections 211a and 212a such as flanges are fastened by a fastening member 215 such as a screw, whereby the first and second division members 211 and 212 are combined. Combining sections 212b and 213b such as flanges are fastened by a fastening member 216 such as a screw, whereby the second and third division members 212 and 213 are combined. Consequently, the first to third division members 211, 212, and 213 function as the outer cylinder 202.

The distortion detecting unit 207 is provided in the second division member 212. The distortion detecting unit 207 has a configuration same as the configuration of the distortion detecting unit 7 explained above except that the distortion detecting unit 207 is provided in the second division member 212. The second division member 212 of the outer cylinder 202 is formed in a thin shape in which the outer diameter of a portion 212d where the distortion detecting unit 207 is attached is set smaller than the outer diameter of the other portions of the second division member 212.

As explained above, the electric cylinder 201 includes the outer cylinder 202, the rod 3, the bearings 4, the rotating shaft 5, the screw mechanism 6, and the distortion detecting unit 207. Load detection can be performed by the distortion detecting unit 207 provided in the outer cylinder 202 (the second division member 202). Therefore, it is unnecessary to separately provide a load cell or the like and simplification of the configuration of the electric cylinder 201 can be realized.

As in the two-division system explained above, the electric cylinder 201 of the three-division system realizes a reduction in a delivery period compared with the single member system shown in FIG. 9. The electric cylinder 201 can realize a reduction in maintenance and repairing costs. In the electric cylinder 201 of the three-division system, components increase a little compared with the electric cylinder 1 of the two-division system. However, since the length of the respective members (the first to third division members 211, 212, and 213) is reduced, machining is easy.

Figure 13:
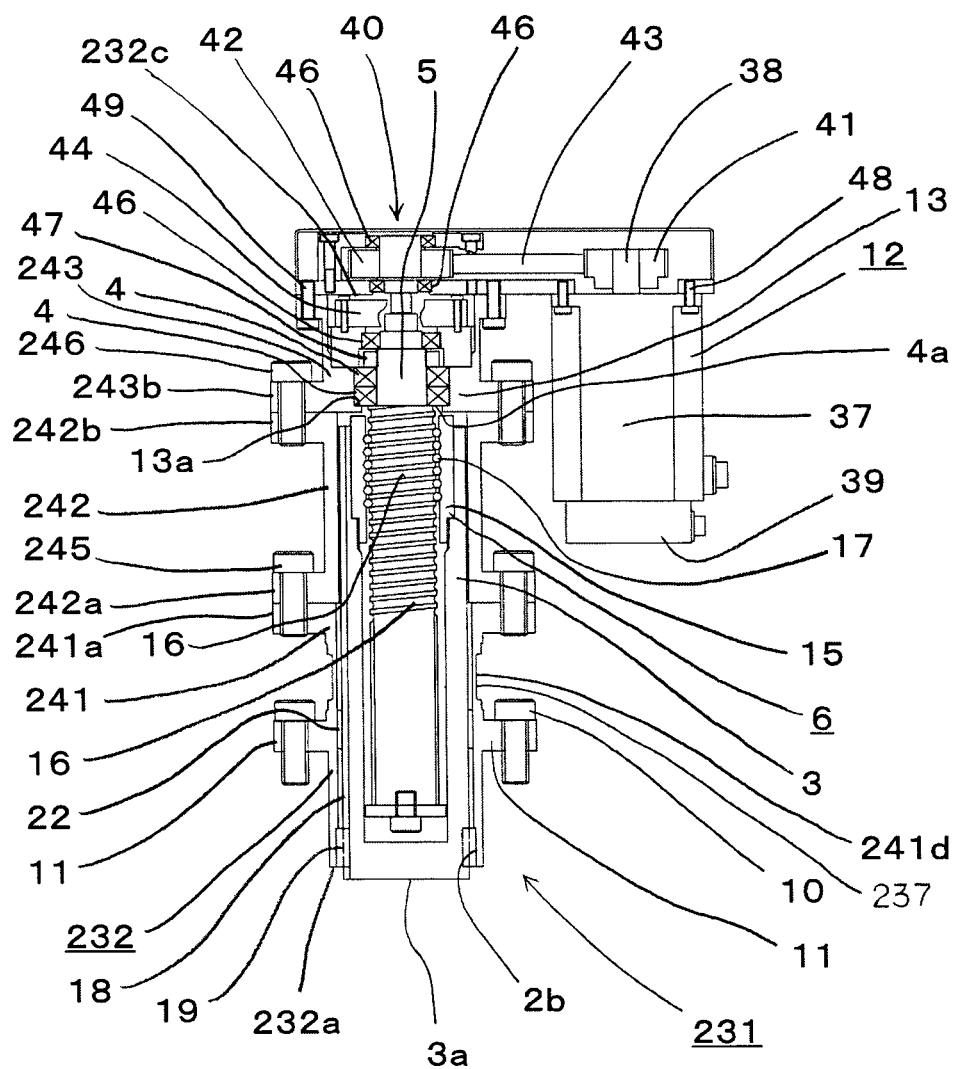
FIG. 13 is a schematic sectional view of another example of the electric cylinder of the three-division system.

The electric cylinder 231 shown in FIG. 13 includes an outer cylinder 232, the rod 3, the bearings 4, the rotating shaft 5, the screw mechanism 6, and a distortion detecting unit 237. The outer cylinder 232 includes a first division member 241, a second division member 242, and a third division member 243. The first division member 241 includes the fixing section 11 and is arranged on one end side 232a. The third division member 243 includes the bearing holding section 13, which holds the bearings 4, and is arranged on the other end side 232c. The second division member 242 is arranged between the first division member 241 and the third division member 243.

Combining sections 241a and 242a such as flanges are fastened by a fastening member 245 such as a screw, whereby the first and second division members 241 and 242 are combined. Combining sections 242b and 243b such as flanges are fastened by a fastening member 246 such as a screw, whereby the second and third division members 242 and 243 are combined. Consequently, the first to third division members 241, 242, and 243 function as the outer cylinder 232.

The distortion detecting unit 237 is provided in the first division member 241. The distortion detecting unit 237 has a configuration same as the configuration of the distortion detecting units 7 and 207 explained above except that the distortion detecting unit 237 is provided in the first division member 241. The first division member 241 of the outer cylinder 232 is formed in a thin shape in which the outer diameter of a portion 241d where the distortion detecting unit 237 is attached is set smaller than the outer diameter of the other portions of the first division member 241.

As explained above, the electric cylinder 231 includes the outer cylinder 232, the rod 3, the bearings 4, the rotating shaft 5, the screw mechanism 6, and the distortion detecting unit 237. Load detection can be performed by the distortion detecting unit 237 provided in the outer cylinder 232 (the first division member 241). Therefore, it is unnecessary to separately provide a load cell or the like and simplification of the configuration of the electric cylinder 231 can be realized.

Figure 14:
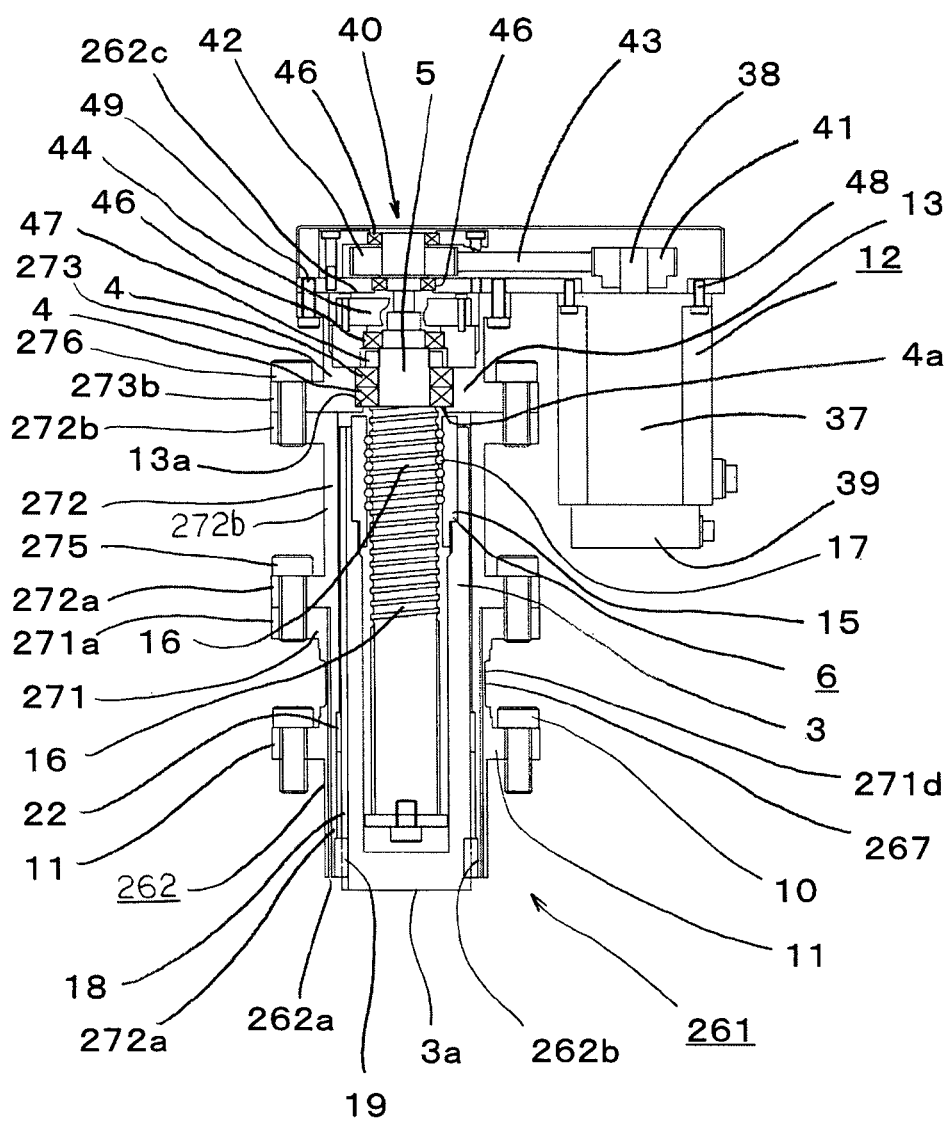
FIG. 14 is a schematic sectional view of still another example of the electric cylinder of the three-division system.
Figure 15:
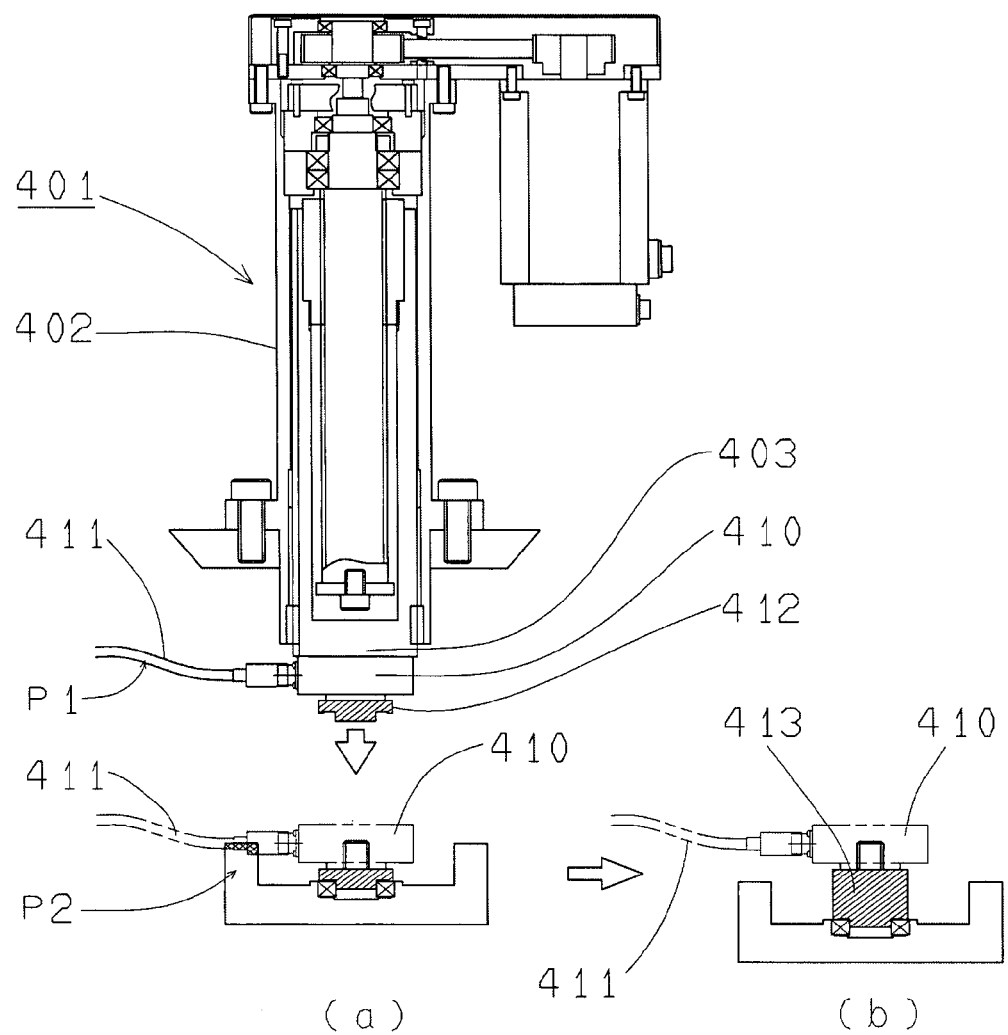
FIG. 15 is a diagram showing problems in the case in which a load cell is provided at the distal end of the rod of the electric cylinder.

The electric cylinder 261 shown in FIG. 14 includes an outer cylinder 262, the rod 3, the bearings 4, the rotating shaft 5, the screw mechanism 6, and a distortion detecting unit 267. The outer cylinder 262 includes a first division member 271, a second division member 272, and a third division member 273. The first division member 271 includes the fixing section 11 and is arranged on one end side 262a. The third division member 273 includes the bearing holding section 13, which holds the bearings 4, and is arranged on the other end side 262c. The second division member 272 is attached such that a main part 272b thereof is arranged between the first division member 271 and the third division member 273.

Combining sections 271a and 272a such as flanges are fastened by a fastening member 275 such as a screw, whereby the first and second division members 271 and 272 are combined. Combining sections 272b and 273b such as flanges are fastened by a fastening member 276 such as a screw, whereby the second and third division members 272 and 273 are combined. Consequently, the first to third division members 271, 272, and 273 function as the outer cylinder 262.

The second division member 272 includes a cylindrical portion 272a on the one end side 262a with respect to a fastening position with the first division member 271. The cylindrical portion 272a is provided up to a position on the one end side 262a with respect to the fixing section 11, and regulates the rotation of the rod 3 in the position on the one end side 262a with respect to the fixing section 11. Specifically, the bush member 19 fit in by press-fitting (interference fit) is attached on the inner side of an opening 262b on the one end side 262a of the outer cylinder 262 (the cylindrical portion 272a of the second division member 272). As explained above with reference to FIG. 4, this bush member 19 engages with the grooves 18 of the rod 3 to regulate the rotation of the rod 3. The first division member 271 is provided to surround the outer side of the cylindrical member 272a of the second division member 272.

The distortion detecting unit 267 is provided in the first division member 271. The distortion detecting unit 267 has a configuration same as the configuration of the distortion detecting units 7 and 207 explained above except that the distortion detecting unit 267 is provided in the first division member 271. The first division member 271 of the outer cylinder 262 is formed in a thin shape in which the outer diameter of a portion 271d where the distortion detecting unit 267 is attached is set smaller than the outer diameter of the other portions of the first division member 271.

As explained above, the electric cylinder 261 includes the outer cylinder 262, the rod 3, the bearings 4, the rotating shaft 5, the screw mechanism 6, and the distortion detecting unit 267. Load detection can be performed by the distortion detecting unit 267 provided in the outer cylinder 262 (the first division member 271). Therefore, it is unnecessary to separately provide a load cell or the like and simplification of the configuration of the electric cylinder 261 can be realized.

As explained above, the electric cylinders 201, 231, and 261 is reduced in the length in the axis direction to realize a reduction in the size of the apparatus, realizes a reduction in a delivery period, and realizes a flexible external configuration of the electric cylinder system 100.

REFERENCE SIGNS LIST

1 . . . electric cylinder, 2 . . . outer cylinder, 3 . . . rod, 4 . . . bearings, 5 . . . rotating shaft, 6 . . . screw mechanism, 7 . . . distortion detecting unit, 11 . . . fixing section, 100 . . . electric cylinder system

The invention claimed is:

1. An electric cylinder comprising:
an outer cylinder including, on a first end side, a fixing section for fixing the electric cylinder to an attachment place;
a rod configured to be capable of projection as expanding in an axis direction from an opening on the first end side of the outer cylinder and configured to be capable of retraction as contracting in the axis direction to the inside from the opening;
a bearing provided on a second end side and on an inside of the outer cylinder;
a rotating shaft rotatably supported by the bearing and driven to rotate by a driving force of a motor;
a screw mechanism configured to convert a rotational motion of the rotating shaft into a linear motion of the rod and transmit the linear motion; and
a distortion detecting unit provided in a position between a position on an outer circumference of the outer cylinder where the bearing is provided and the fixing section, wherein
the outer cylinder includes at least two or more division members that can be divided and combined, and
the distortion detecting unit is provided in one division member among the two or more division members.

2. The electric cylinder according to claim 1, wherein
the outer cylinder includes a first division member and a second division member,
the first division member includes the fixing section and is arranged on the first end side, and
the second division member includes a bearing holding section that holds the bearing.

3. The electric cylinder according to claim 2, wherein the distortion detecting unit is provided in the second division member.

4. The electric cylinder according to claim 2, wherein the distortion detecting unit is provided in the first division member.

5. The electric cylinder according to claim 3, wherein the outer cylinder is formed in a thin shape in which an outer diameter of a portion where the distortion detecting unit is attached is set small.

6. The electric cylinder according to claim 5, further comprising a reduction gear provided between the motor and the rotating shaft.

7. The electric cylinder according to claim 6, further comprising a transmitting mechanism configured to transmit torque of an output shaft of the motor to the rotating shaft, wherein the motor is arranged to set the output shaft parallel to the rotating shaft and is provided in a position orthogonal to the axis direction with respect to the outer cylinder, and the reduction gear is arranged between the rotating shaft and the transmitting mechanism.

8. The electric cylinder according to claim 1, wherein the outer cylinder includes a first division member, a second division member, and a third division member, the first division member includes the fixing section and is arranged on the first end side, the third division member includes a bearing holding section which holds the bearing, and is arranged on the second end side, and the second division member is arranged between the first division member and the third division member.

9. The electric cylinder according to claim 8, wherein the distortion detecting unit is provided in the second division member.

10. The electric cylinder according to claim 8, wherein the distortion detecting unit is provided in the first division member.

11. The electric cylinder according to claim 10, wherein the second division member includes a cylindrical portion on the first end side with respect to a fastening position with the first division member, the cylindrical portion is provided up to a position on the first end side with respect to the fixing section, and regulates rotation of the rod in the position on the first end side with respect to the fixing section, and the first division member is provided to surround an outer side of the cylindrical portion of the second division member.

12. An electric cylinder system comprising:
the electric cylinder according to claim 1; and
a control unit configured to control the electric cylinder.

13. An electric cylinder system comprising:
the electric cylinder according to claim 2; and
a control unit configured to control the electric cylinder.

14. An electric cylinder system comprising:
the electric cylinder according to claim 3; and
a control unit configured to control the electric cylinder.

15. An electric cylinder system comprising:
the electric cylinder according to claim 4; and
a control unit configured to control the electric cylinder.

16. An electric cylinder system comprising:
the electric cylinder according to claim 5; and
a control unit configured to control the electric cylinder.

17. An electric cylinder system comprising:
the electric cylinder according to claim 6; and
a control unit configured to control the electric cylinder.

18. An electric cylinder system comprising:
the electric cylinder according to claim 8; and
a control unit configured to control the electric cylinder.

19. An electric cylinder system comprising:
the electric cylinder according to claim 9; and
a control unit configured to control the electric cylinder.

20. An electric cylinder system comprising:
the electric cylinder according to claim 10; and
a control unit configured to control the electric cylinder.

* * * * *